Figure 1:
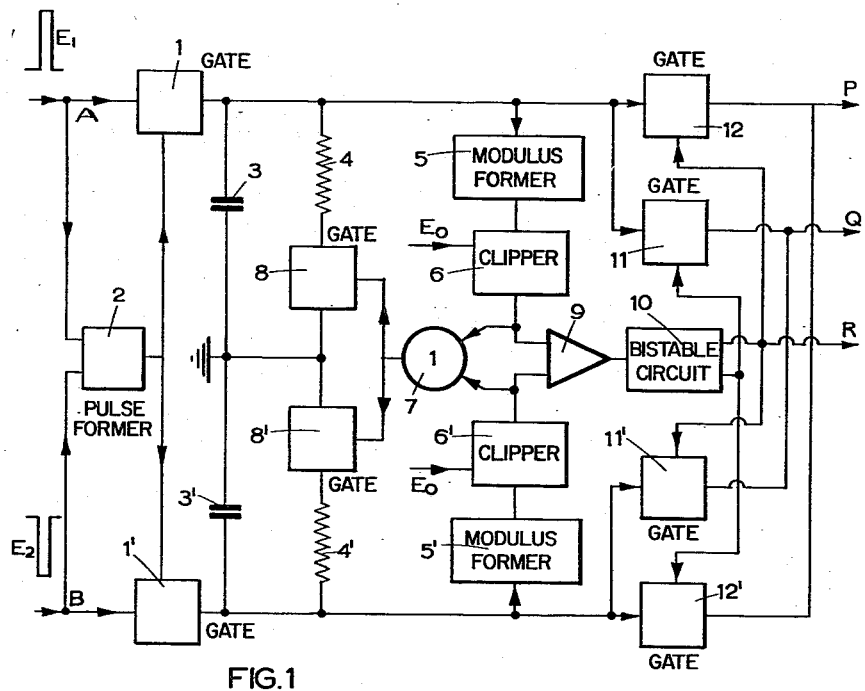

July 11, 1961   E. L. C. WHITE   2,992,428
PULSE AMPLITUDE COMPARISON CIRCUITS
Filed Aug. 7, 1958   2 Sheets-Sheet 1

July 11, 1961  E. L. C. WHITE  2,992,428
PULSE AMPLITUDE COMPARISON CIRCUITS
Filed Aug. 7, 1958  2 Sheets-Sheet 2

Inventor
E. L. C. White
By Gascott Downing Seebold
Attys.

United States Patent Office 2,992,428
Patented July 11, 1961

2,992,428
PULSE AMPLITUDE COMPARISON CIRCUITS
Eric Lawrence Casling White, Iver, England, assignor to Electric & Musical Industries Limited, Hayes, Middlesex, England, a company of Great Britain
Filed Aug. 7, 1958, Ser. No. 753,796
Claims priority, application Great Britain Aug. 10, 1957
8 Claims. (Cl. 343—119)

This invention relates to pulse amplitude comparison circuits and especially to circuits for measuring the ratio of the amplitudes of pulses.

It is sometimes required to measure and record the ratio of the amplitude of two pulses, these pulses usually occurring simultantously. This may be the case for example when it is desired to find the direction of an unknown source of pulses and may be achieved by measuring the ratio of the amplitude of the signals produced by each pulse in a pair of aerials having differently orientated polar diagrams. It has been proposed in the past to determine the required ratio by applying the two signals to the two pairs of deflecting plates or deflection coils of a cathode ray tube and observing either visually or photographically the direction of the resulting trace. This method clearly has several disadvantages, for example when the results are obtained visually the method can be very tiring for the operator and when the results are obtained photographically the method can be very uneconomical in respect of the amount of photographic material used. In some applications moreover it may be desired that a warning of the arrival of a particular type of signal shall be provided.

The principal object of the present invention is to remove or substantially reduce the disadvantages indicated above.

A further object of the present invention is to provide means for recording the ratio of two pulses electrically.

Yet another object of the invention is to provide apparatus capable of deriving the width of electrical pulses.

According to the present invention there is provided a circuit arrangement for comparing the charges stored in a pair of reactive elements wherein the charges on said elements are varied according to a predetermined law and when the charge in one of said elements reaches a predetermined level the variation of charge of both elements is stopped, whereby the potential of the other of said elements is then representative of the ratio of said initial charges.

According to a particular feature of the present invention there is provided a circuit arrangement for comparing the amplitude of two signals, comprising two reactive elements, means for simultaneously applying signals to be compared to charge said elements, virtually identical means for thereafter varying the charges on said elements and means for determining the magnitude of the charge in one of said elements after the charge on the other has reached a predetermined magnitude.

According to a further feature of the invention a third signal is formed whose amplitude is equal to or proportional to the sum of the scalar magnitudes of two signals to be compared, said third signal being caused to charge a third reactive element, simultaneously with the charging of the first two reactive elements, the third reactive element having similar leakage characteristics to said above mentioned elements, and wherein virtually identical leakage paths for said three elements are closed when the potential of said third element has attained a predetermined value, whereby the charge on either of said first mentioned elements together with the sign of the charge on said other element are representative of the desired ratio.

Figure 2:
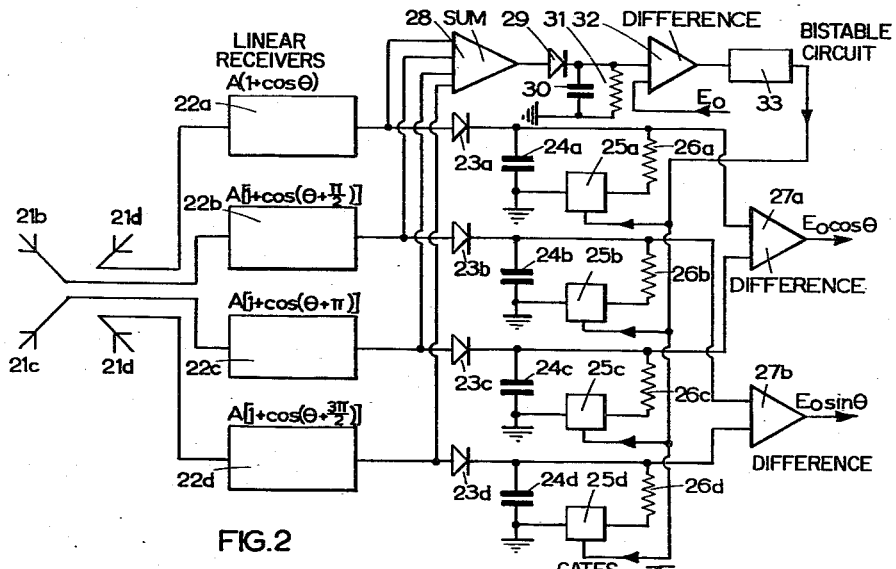
Figure 3:
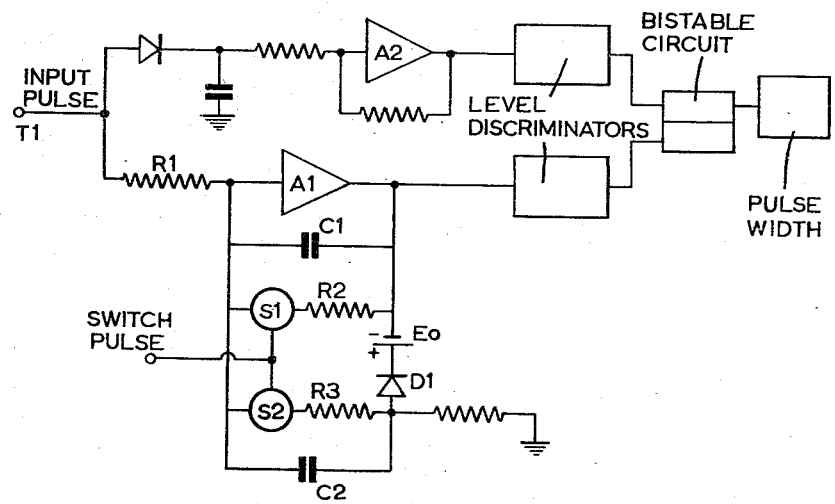
Figure 4:
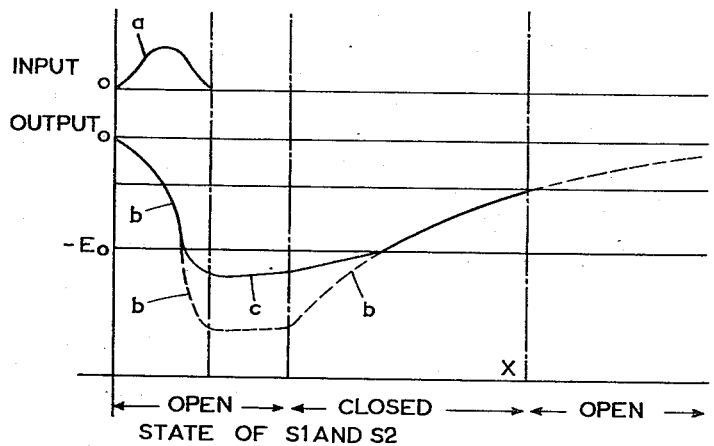

In order that the present invention may be clearly understood and readily carried into effect, the invention will be described with reference to the accompanying drawings, in which:

FIGURE 1 illustrates an example of the present invention for comparing the amplitudes of pulses, FIGURE 2 illustrates an application of the present invention to direction finding, employing the above mentioned particular features, FIGURE 3 illustrates a modification of the invention, and FIGURE 4 illustrates waveforms to be referred to in description of the operation of FIGURE 3.

Referring to FIGURE 1, two simultaneous pulses having amplitudes $E_1$ and $E_2$ respectively and the ratios of which it is required to determine are applied to the input points A and B. The points A and B comprise inputs to the gates 1 and 1', which may be of any suitable known form and to the gate pulse former 2, which provides pulses to open the gates 1 and 1' in response to the presence of the pulses $E_1$ and $E_2$. The gate pulse former 2 may comprise for example a differentiating circuit responsive to changes of input signal to open gates 1 and 1' at the beginning of a pulse and close them at the end of a pulse. The outputs of 1 and 1' are applied to the reactive storage elements comprising capacitors 3 and 3' respectively in parallel with which are connected discharge circuits comprising the resistor 4 and the gate 8 and the resistor 4' and the gate 8' respectively, so that 3 and 3' are only discharging through 4 and 4' whilst the two gates 8 and 8' are opened in response to the presence of input signals to them from 7. Reference 7 denotes a gate having two input terminals and which provides an output only when there is a signal at at least one input terminal. The inputs to 7 are derived from the modulus former 5 and the modulus former 5' via the clipper circuits 6 and 6' respectively, which are connected to the outputs of gates 1 and 1'. The modulus formers 5 and 5' are substantially as shown in the specification of British Patent No. 763,576 and comprise a pair of diodes connected to the respective output terminals of an amplifier, the modulus of the input then being set up across an impedance connected to the other electrodes of the diodes. The clippers 6 and 6' comprise biassed diodes and also receive input signals representing a predetermined reference bias voltage $E_0$, arranged to provide no output when the signals provided by the respective modulus formers 5 and 5' fall below $E_0$. The inputs to 7 are common with the inputs to a differential amplifier 9 which provides a signal to set bistable element 10 to one or other of its stable states. According to the particular state in which 10 is resting either the gates 11 and 12' are open or the gates 11' and 12 are open, the voltage across 3 being applied to 11 and 12 whilst the voltage appearing across 3', is applied to 11' and 12'. The gates 11 and 11' have a common output point Q and the gates 12 and 12' have a common output point P, a further output point R being connected to the gating inputs to 12 and 11'.

In order that the operation of FIGURE 1 shall be understood, suppose that the respective peak potentials of the pulses $E_1$ and $E_2$ are stored in the equal condensers 3 and 3' which have capacitances C and that equal resistors 4 and 4' have resistances R. If $E_1$ is greater than $E_2$ the time $t$, taken by $E_1$ to reach the predetermined value $E_0$ is $$t = CR \log \frac{E_1}{E_0}$$

In this time $E_2$ has decayed to $$E_2' = E_2 e^{\frac{-t}{CR}}$$

$$\therefore E_2' = E_2 \cdot \frac{E_0}{E_1}$$

$$\therefore \frac{E_2'}{E_0} = \frac{E_2}{E_1}$$

Similarly if $E_1$ is less than $E_2$ $$\frac{E_1'}{E_0} = \frac{E_1}{E_2}$$

The presence of potentials $E_1$ and $E_2$ at A and B causes gates 1 and 1' to be opened thereby charging 3 and 3' to the peak potentials $E_1$ and $E_2$. The presence of these potentials at the inputs to the modulus formers 5 and 5' assuming that they are greater than $E_0$ cause 6 and 6' to pass output signals to 7 and 9 respectively and the output of 7 causes gates 8 and 8' to be opened so that 3 and 3' discharge through the resistors 4 and 4'. Assuming $E_1$ is greater than $E_2$, the potential across 3' reaches $E_0$ before that across 3 reaches $E_0$ so that the output of 6' ceases first and is followed some time after by a cessation of the output of 6 when the potential across 3 has dropped to $E_0$. When both the outputs from 6 and 6' have ceased, the output of 7 also ceases and gates 8' and 8 are closed so that the existing potentials are held on 3 and 3' and are $E_0$ and $$E_0 \times \frac{E_2}{E_1}$$

respectively, thus giving an indication of the ratio $$\frac{E_2}{E_1}$$

of the two pulses. The differential amplifier 9 serves to set the bistable element 10 to a state corresponding to whichever of the outputs of 6 or 6' is cut off first, thus if as in the present example $E_1$ is greater than $E_2$ the output of 6' is cut off before that of 6 and gates 11' and 12 are opened. In the alternative case where $E_2$ is greater than $E_1$ gates 11 and 12' are opened and the outputs at P, Q and R represent the sign of $E_1$ or $E_2$, $$\frac{E_2}{E_1}$$

or $$\frac{E_1}{E_2}$$

and the sign of $/E_1/-/E_2/$.

It has been assumed in description of FIGURE 1 that the pulse potentials $E_1$ and $E_2$ can be of positive or negative polarity and the gate pulse former is arranged to be operated either by positive or negative input pulses and gates 1 and 1' are bi-directional. If however the input pulses at A and B are always of one polarity the apparatus in FIGURE 1 may be simplified in that the gates 1 and 1' can be simple diodes, in which case the gate pulse former 2 may not be necessary and also the modulus formers 5 and 5' and the gates 12 and 12' become redundant.

Instead of detecting the sign of $/E_1/-/E_2/$ as in the arrangement of FIGURE 1, to resolve the ambiguities in the outputs of this arrangement, means may be provided for forming a third pulse of amplitude equal to the sum of the scalar magnitudes of $E_1$ and $E_2$. The third pulse may be caused to charge a capacitor having a similar leakage time constant to the capacitors on which $E_1$ and $E_2$ are stored, the leakage paths being blocked when the potential on the third capacitance has fallen to a predetermined value.

The third pulse will be $/E_1/+/E_2/$ and the time taken to decay to a value $E_0$ is $$t = CR \log \frac{/E_1/+/E_2/}{E_0}$$

So that in this time $E_1$ decays to $$E_1' = E_1 e^{\frac{-t}{CR}} = E_1 \frac{E_0}{/E_1/+/E_2/}$$

$$\therefore \frac{E_1'}{E_0} = \frac{E_1}{/E_1/+/E_2/} = \frac{E_1}{/E_1/} \frac{1}{1+\frac{/E_2/}{/E_1/}}$$

In one particular case when both pulses are positive, the above expression becomes:

$$\frac{E_1'}{E_0} = \frac{1}{1+\frac{E_2}{E_1}}$$

Therefore from one of the first two capacitors there may be derived $$\frac{/E_1/}{/E_1/+/E_2/}$$

together with sign of $E_1$ and similarly from the other of these two capacitors there may be derived the sign of $E_2$, which information is sufficient to give the ratio required of $E_1$ to $E_2$.

FIGURE 2 shows an example of an arrangement in which to facilitate derivation of the ratios, use is made of a third pulse of amplitude equal to or proportional to the sum of the scalar magnitudes of pulses to be compared, although the pulses to be compared are always positive. This example is especially applicable to direction finding.

Four aerials 21a, 21b, 21c and 21d are provided arranged in "x" formation to have equally spaced polar diagrams substantially of the cardioid type in the azimuth plane, so that if the azimuth angle is $\theta$, the responses of the aerials to a pulse coming from a direction $\theta$ are respectively, $$A(1+\cos \theta)$$

$$A\left(1+\cos\left(\theta+\frac{\pi}{2}\right)\right)$$

$$A(1+\cos(\theta+\pi))$$

$$A\left(1+\cos\left(\theta+\frac{3\pi}{2}\right)\right)$$

These aerials feed four linear receivers 22a, 22b, 22c and 22d, respectively, having substantially equal gains and the outputs from these receivers are fed respectively via rectifiers 23a, 23b, 23c and 23d to respective associated equal capacitors 24a, 24b, 24c and 24d. The output pulses from the receivers are rectified and the charges stored on the separate capacitors have amplitudes depending on the ratios of the aerial responses. Associated with capacitors 24a, 24b, 24c and 24d are discharge circuits comprising gates 25a, 25b, 25c and 25d and resistors 26a, 26b, 26c and 26d. These gates are open in response to signals derived in a manner which will be described hereafter. The equal capacitors 24a, 24b, 24c and 24d are also coupled in pairs to differential amplifiers 27a and 27b, 27a receiving inputs from 24a and 24c and 27b receiving inputs from 24b and 24d. The outputs from the receivers 22a, 22b, 22c and 22d are coupled furthermore to a summing amplifier 28 whose output is coupled via a rectifier 29 to a storage condenser 30 having a discharge circuit comprising the resistor 31. The storage condenser 30 is also coupled to a differential amplifier 32 which receives a reference potential $E_0$ at its second input and the output of 32 is used to operate a bistable element or toggle, 33 and the output of 33 comprises operating signals for the gates 25a, 25b, 25c and 25d in the discharge circuits of the other four storage condensers.

Let it be assumed that the charges stored on the capacitor 24a, 24b, 24c and 24d are $E_1$, $E_2$, $E_3$ and $E_4$ respectively immediately after the occurrence of a pulse input to the receivers. The signal stored on the capacitor 30 is the sum of the signals $E_1$, $E_2$, $E_3$, $E_4$ and the differential amplifier 30 operates in the presence of a charge on 30 which is in excess of $E_0$ to cause 33 to produce a signal which opens gates 25a, 25b, 25c and 25d. The charge on 30 discharges through 31 until such time as it reaches a value $E_0$ and at this time the bistable element 33 is switched over and the gates 25a, 25b, 25c and 25d are closed.

The time taken for the charge on 30 to decay to $E_0$ is $$t = CR \log \frac{E_1 + E_2 + E_3 + E_4}{E_0}$$

so that in this time $E_1$ has decayed to a value $$E_1' + E_1 \frac{-t}{eCR} = E_1$$

similarly $E_2$, $E_3$ and $E_4$ decay in the same time to $E_2'$, $E_3'$ and $E_4'$ where $$E_2' = E_2 \frac{E_0}{E_1 + E_2 + E_3 + E_4}$$

$$E_3' = E_3 \frac{E_0}{E_1 + E_2 + E_3 + E_4}$$

$$E_4' = E_4 \frac{E_0}{E_1 + E_2 + E_3 + E_4}$$

Therefore the signal at the output of 27a is $$\frac{E_0 (E_1 - E_3)}{E_1 + E_2 + E_3 + E_4}$$

and the signal at the output of 27b is $$\frac{E_0 (E_2 - E_4)}{E_2 + E_2 + E_3 + E_4}$$

By substitution of the signals derived from the respective receivers corresponding to $E_1$, $E_2$, $E_3$ and $E_4$ in the last two expressions it may be shown that the outputs of 27a and 27b are proportional to $E_0 \cos \theta$ and $E_0 \sin \theta$, respectively and a representation is therefore available of the direction from which the pulses arriving at the aerials are received. This information is stored on the four storage capacitors 24a, 24b, 24c and 24d but since further pulses may be arriving subsequently it is desirable in most cases that the information at the outputs of 27a and 27b shall be utilised immediately or stored in suitable more permanent storage means.

In a modification of FIGURE 2, it may be desirable to allow the capacitors 24a, 24b, 24c and 24d to decay in potential exponentially to zero and to follow these capacitors with buffer amplifiers feeding storage capacitors through gates controlled in known manner by the output of the circuit 33.

Suitable stores may be of the analogue or digital form and in this latter case the potentials $E_0 \cos \theta$ and $E_0 \sin \theta$ must first be passed to an analogue-to-digital converter of any known form. If however signals are to be stored for any length of time it may be preferable to employ stores of the digital type to avoid drift effects or the like.

According to an extension of the above particular feature of the invention, the logarithm of the ratios of the charges on two condensers may be determined by observing the time difference between the times at which the two discharging potentials reach a predetermined potential level.

It is often desirable to measure the width of received pulses and the present invention can be readily adapted to such measurement. In general pulses are not usually perfectly rectangular. That is the rise time and fall time may in general be comparable with the duration of a pulse so that any simple measurement of width of a pulse at an arbitrary amplitude may give a result which is not independent of the peak amplitude even for a constant pulse shape. It is convenient therefore for the purposes of the present example to define pulse width as the ratio of the area of the pulse to the height.

To achieve pulse width measurement therefore, the pulse to be measured is applied to two charging circuits, one having circuit parameters chosen specifically for giving an indication of peak voltage to correspond to the height of the pulse and one having circuit parameters chosen to give an indication of pulse area. The latter may be an integrating circuit of the well known Miller type. The circuit such as described above is therefore capable of giving an indication of the ratio of the two quantities representing pulse height and pulse area.

A difficulty may arise in pulse width determination as a result of the relatively greater range of areas that may be required to be covered as opposed to height. This is clear from the consideration that area = height × width and height and width may both have a range of 30:1.

The apparatus shown in diagrammatical form in FIGURE 3 is capable of accommodating a very wide range of pulse areas. Referring to FIGURE 3, integration for the area of a pulse is performed by a Miller type integrator, the integrating capacitor C1 being connected as a shunt feedback element across a high gain amplifier A1 of known form. The discharging resistor R1 and the capacitor C1 are chosen to given a convenient potential for the smallest area to be accommodated. This potential may for example be of the order of five volts and a practical limit of the order of one hundred volts may be reached for an area of twenty times the smallest area. In order that greater areas may be accommodated without reducing the sensitivity of the apparatus to smaller areas an additional capacitor C2 is provided. C2 is chosen to have a value $n$ C1 where $n$ in the present example is chosen to be 20 and this capacitor is effectively connected in parallel with C1 when the bias $E_0$ on a diode D1 is overcome by the potential on C1. $E_0$ may be chosen to be 10 volts. Thus the original limit of 100 volts across C1 is reached when the area to be indicated is 362 times the above mentioned minimum area.

In parallel with C1 there is connected an electronic switch S1 in series with a resistor R1 and in parallel with C2 is an electronic switch S2 in series with a resistor R3. Switches S1 and S2 are operated by switching pulses applied via the input terminal T2. To achieve an exponential discharge across C1 and C2 which reaches the bias level $E_0$ in the same time as it would be reached were it possible to allow C1 to charge to a voltage representing the maximum area (about 1800 volts in this example) without overloading, the resistors R2, R3 and capacitors C1 and C2 are chosen so that $C1R2 = C2R3$ and the switches S1 and S2 are arranged to be closed whilst the capacitors are being charged. This is readily achieved as in the circuit of FIGURE 1, by providing a switching pulse former similar to 2, to close S1 and S2 in the presence of an input pulse to the circuit.

The discharge waveforms across C1 are shown in FIGURE 4. In the absence of C2 and R3, a pulse such as shown at $a$ is integrated by the Miller circuit to give a curve $b$. When S1 is closed, the potential therefore decays along a curve $b$ and a point X on the decay curve may be selected according to time or voltage for S1 to be opened again. If a linear relationship is required between output voltage and pulse width, the switch is operated after a given time but if a logarithmic relationship between time and pulse width is required, the switch is operated when a given voltage is reached. In the presence of the resistor R3, capacitor C2 and the additional switch as described above however, the waveform extending above the bias voltage $E_0$ for the diode $D1$ is modified to that shown at $c$ and this curve decays to $E_0$ in the same time as the curve $b$ for the hypothetical case when C2 and R3 are absent. Thus when D1 becomes an open circuit the decay waveform is identical with $b$.

Although only two reactive storage devices comprising the capacitors C1 and C2 are shown in the example described above clearly further stages similar to C2 and R3 with further biased diodes may be employed if desired to increase the range still further, without reducing the sensitivity to the smaller pulse areas. For example, a further capacitor C3, several times bigger than C2 may be provided, biased by a voltage, say $2E_0$ and shunted by a resistor R4 and a further switch, such that $$C1R2=C2R3=C3R4$$

FIGURE 3 has only been described in detail above to an extent necessary for the understanding and putting into effect of the modification of the invention for obtaining accommodation of a greater range of pulse areas. The remainder of the arrangement which is mainly in block form comprises the arrangement for providing a potential representative of the peak amplitude or height of pulses at the input terminal T1, together with apparatus substantially identical with that shown in FIGURE 1 for making comparison of pulse height and area to give an indication of the pulse width as required.

Apparatus such as described above for accommodating a wide range of pulse areas without reducing the sensitivity to small areas may be applied if desired to apparatus for measuring pulse height. If for example R1 in FIGURE 3 is replaced by a capacitor in series with a diode, the total charge passing to C1, C2 etc. is proportional to the height of a pulse at T1 and not to the area. Further description of this would appear to be unnecessary but clearly the modification is widely applicable to circuits according to the invention.

What I claim is:

1. Electrical comparison apparatus comprising two reactive storage elements, means for applying respective signals to be compared to said storage elements, respective discharge circuits for said storage elements to provide a discharge of said storage elements according to a predetermined law, each circuit including a gate for controlling said discharge, a signal level detecting means for closing said gates simultaneously when the level of the signal in one of said storage elements has fallen to a predetermined level and means for sensing the signal level in the other of said storage elements to determine the ratio of said signals.

2. Electrical comparison apparatus according to claim 1, said signal level detecting means being operative to close said gates simultaneously when the level of signals in both said storage elements has fallen below a predetermined level.

3. Electrical comparison apparatus according to claim 2 including means for producing a signal representing the sign of the difference between the moduli of signals stored in said storage elements and means for producing a signal representing the sign of one of said signals stored in said storage elements, to determine the sign and relative magnitudes of said stored signals.

4. Electrical comparison apparatus according to claim 3 including a bistable circuit, two output terminals, means responsive to said stored signals to set said bistable circuit to one state if one of said signals is of greater magnitude than the other and to set said bistable circuit to its other state if said one signal is smaller in magnitude than said other of said signals, and gating means responsive to one state of said bistable circuit to apply the signal stored in a first of said storage elements to a first of said output terminals and to apply the signal stored in the second of said storage elements to a second of said output terminals and responsive to the other state of said bistable element to apply the signal stored in said second storage element to said first output terminal and to apply the signal stored in said first storage element to said second output terminal.

5. Apparatus according to claim 1 comprising a further reactive storage element, summing means for producing a further signal representing the sum of the scaler magnitudes of said signals to be compared, means for applying said further signal to said further storage element, a further discharge circuit to provide a discharge of said further storage element according to said predetermined law, said further discharge circuit including a gate operative simultaneously with said first mentioned gates in response to said level detecting means, said level detecting means being operative to close said gates when the signal level in said further storage means has fallen below a predetermined level, and means for sensing the signal level in said first mentioned two storage elements to determine the ratio and sign of said two signals to be compared.

6. Electrical comparison apparatus comprising five reactive storage elements, means for applying to four of said elements four respective signals to be compared, and means for applying to the fifth storage element a signal equal to the scalar sum of said four signals, respective discharge circuits for said storage elements to provide a discharge of said storage elements according to a predetermined law, each circuit including a gate for controlling said discharge, a signal level detecting means for closing said gates simultaneously when the level of the signal stored in said fifth storage element has fallen below a predetermined level, means for sensing the levels of signals left in said four storage elements to determine their respective magnitudes relative to said scalar magnitude, and subtracting means for subtracting between the first and third and the second and fourth of said signal levels whereby if said signals to be compared are respectively pulses of the type received by respective ones of an array of four aerials arranged in X formation receiving in principle directions each at right angles to the next, a representation of the direction in an azimuth plane of the incidence of received pulses is produced.

7. Apparatus according to claim 1 one of said reactive storage elements comprising two reactive storage devices with means for applying input signals directly to one of said devices, a connecting circuit interconnecting said storage devices, said connecting circuit including a gate, sensing means for sensing the level of signals stored in said one storage device to open said gate when the charge on said one storage device attains a predetermined level, discharge circuits for said storage devices being provided with predetermined laws of variation such that the overall law of variation is the same as that for a single reactive storage device of equivalent storage capacity to said one storage element.

8. Apparatus according to claim 7, said reactive storage elements comprising capacitors and said gate comprising a biased diode, said predetermined level being determined by the bias on said diode and said capacitors being connected in parallel when said gate is opened.

References Cited in the file of this patent

UNITED STATES PATENTS 2,659,082    Pearson _____ Nov. 10, 1953